United States Patent
Nilsson et al.

(10) Patent No.: US 11,308,729 B2
(45) Date of Patent: Apr. 19, 2022

(54) BIOMETRIC IMAGING DEVICE AND METHOD FOR MANUFACTURING A BIOMETRIC IMAGING DEVICE

(71) Applicant: Fingerprint Cards AB, Gothenburg (SE)

(72) Inventors: René Nilsson, Eslöv (SE); Hans Martinsson, Gothenburg (SE); Ehsan Hashemi, Gothenburg (SE); Farzan Ghavanini, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/979,246

(22) PCT Filed: Mar. 5, 2019

(86) PCT No.: PCT/SE2019/050191
§ 371 (c)(1),
(2) Date: Sep. 9, 2020

(87) PCT Pub. No.: WO2019/177513
PCT Pub. Date: Sep. 19, 2019

(65) Prior Publication Data
US 2020/0410201 A1 Dec. 31, 2020

(30) Foreign Application Priority Data
Mar. 15, 2018 (SE) .................................. 1850287-2

(51) Int. Cl.
*G06K 9/00* (2022.01)
*G02B 27/30* (2006.01)
(Continued)

(52) U.S. Cl.
CPC .......... *G06V 40/1318* (2022.01); *G02B 27/30* (2013.01); *G06F 3/0412* (2013.01); *G06F 1/1637* (2013.01)

(58) Field of Classification Search
CPC .. G02B 2207/123; G02B 27/30; G02B 5/005; G06F 1/1637; G06F 3/0304;
(Continued)

(56) References Cited

U.S. PATENT DOCUMENTS 10,216,975 B1 * 2/2019 He ..................... G06K 9/2018
10,303,921 B1 * 5/2019 He ..................... G02F 1/13318
(Continued)

FOREIGN PATENT DOCUMENTS

| CN | 206657362 U | 11/2017 |
| JP | H1048340 A | 2/1998 |
| WO | 2017206676 A1 | 12/2017 |

OTHER PUBLICATIONS

PCT International Search Report and Written Opinion dated May 13, 2019 for International Application No. PCT/SE2019/050191, 10 pages.
(Continued)

*Primary Examiner* — Dong Hui Liang
(74) *Attorney, Agent, or Firm* — RMCK Law Group, PLC

(57) ABSTRACT

A biometric imaging device configured to capture an image of an object in contact with an outer surface of the imaging device, comprising: an at least partially transparent display panel comprising a repeating transmission pattern defined by an array of display unit cells, each display unit cell having the same transmission pattern; an image sensor comprising a photodetector pixel array arranged underneath the display panel; and a collimator layer arranged between the display panel and the image sensor that comprises a plurality of first
(Continued)

collimating structures having a first collimator opening size and a plurality of second collimating structures having a second collimator opening size different from the first collimator opening size, wherein the respective collimator opening size and relative location of the first and second collimating structure in relation to the display unit cell is based on the transmission pattern of the display unit cell.

18 Claims, 6 Drawing Sheets

(51) Int. Cl.
  *G06F 3/041* (2006.01)
  *G06V 40/13* (2022.01)
  *G06F 1/16* (2006.01)
(58) Field of Classification Search
  CPC .... G06F 3/03547; G06F 3/0412; G06F 21/32; G06F 2203/0338; G06K 9/0004; G06K 9/00046
  USPC .......................................... 345/156, 690–696
  See application file for complete search history.

(56) References Cited

U.S. PATENT DOCUMENTS

| | | | |
|---|---|---|---|
| 10,936,847 B1* | 3/2021 | He ..................... | G06K 9/00046 |
| 2007/0109438 A1 | 5/2007 | Duparre et al. | |
| 2012/0039446 A1 | 2/2012 | Cui et al. | |
| 2016/0224816 A1* | 8/2016 | Smith .................. | G06K 9/0004 |
| 2016/0247010 A1 | 8/2016 | Huang et al. | |
| 2016/0254312 A1 | 9/2016 | Lee et al. | |
| 2017/0124370 A1* | 5/2017 | He ....................... | G06K 9/0002 |
| 2017/0220838 A1* | 8/2017 | He .......................... | G06F 3/044 |
| 2017/0220840 A1* | 8/2017 | Wickboldt ........... | H01L 27/3234 |
| 2017/0220844 A1 | 8/2017 | Jones et al. | |
| 2017/0270342 A1* | 9/2017 | He .......................... | G06F 21/32 |
| 2017/0316248 A1* | 11/2017 | He .......................... | G01L 1/142 |
| 2018/0005005 A1* | 1/2018 | He ....................... | G06K 9/0004 |
| 2018/0012069 A1 | 1/2018 | Chung et al. | |
| 2018/0046281 A1* | 2/2018 | Pi ....................... | G06K 9/00114 |
| 2018/0068160 A1 | 3/2018 | Wu | |
| 2018/0129798 A1* | 5/2018 | He .......................... | G06F 3/042 |
| 2018/0260602 A1* | 9/2018 | He ....................... | A61B 5/1495 |
| 2018/0268190 A1* | 9/2018 | Chung ............... | G06K 9/00013 |
| 2018/0357462 A1* | 12/2018 | Mackey ............. | G06K 9/00026 |
| 2018/0366593 A1* | 12/2018 | Huang .............. | H01L 27/14643 |
| 2019/0012512 A1* | 1/2019 | He ....................... | G06K 9/0004 |
| 2019/0026527 A1* | 1/2019 | He ....................... | G06K 9/0004 |
| 2019/0034020 A1* | 1/2019 | He ....................... | G06K 9/00033 |
| 2019/0050621 A1* | 2/2019 | Xu ....................... | G06K 9/0004 |
| 2019/0065816 A1* | 2/2019 | Reinhold ............... | G06K 9/209 |
| 2019/0073508 A1* | 3/2019 | Ling ....................... | H04N 5/369 |
| 2019/0251326 A1 | 8/2019 | Sun | |
| 2019/0303639 A1* | 10/2019 | He ....................... | G06K 9/0004 |
| 2020/0019749 A1* | 1/2020 | He ....................... | G06K 9/0004 |
| 2020/0050818 A1* | 2/2020 | He ....................... | G06K 9/00906 |
| 2020/0117878 A1* | 4/2020 | Li ....................... | H01L 27/3234 |
| 2020/0259024 A1* | 8/2020 | Huang ............... | H01L 27/14643 |
| 2020/0279090 A1* | 9/2020 | He ....................... | G06K 9/00087 |
| 2020/0380236 A1* | 12/2020 | He .......................... | G06F 3/044 |
| 2020/0387684 A1* | 12/2020 | Setlak .................. | G06K 9/0004 |
| 2020/0395421 A1* | 12/2020 | He ....................... | H01L 27/3262 |
| 2020/0409191 A1* | 12/2020 | He ....................... | G06K 9/00906 |
| 2020/0409217 A1* | 12/2020 | He .................... | G02F 1/133606 |
| 2020/0410201 A1* | 12/2020 | Nilsson ................ | G02B 27/30 |
| 2020/0410207 A1* | 12/2020 | He ....................... | G02B 6/0053 |
| 2021/0004555 A1* | 1/2021 | Panchawagh ......... | G06F 3/0414 |
| 2021/0004557 A1* | 1/2021 | Tordera Salvador .. | G02B 27/30 |
| 2021/0019491 A1* | 1/2021 | Hai ....................... | G06K 9/0004 |
| 2021/0063816 A1* | 3/2021 | He .................... | G02F 1/133603 |
| 2021/0117644 A1* | 4/2021 | Reynolds ........... | G06K 9/00013 |

OTHER PUBLICATIONS

Extended European Search Report dated Apr. 12, 2021 for EP Application No. 19767789.1, 8 pages.

* cited by examiner

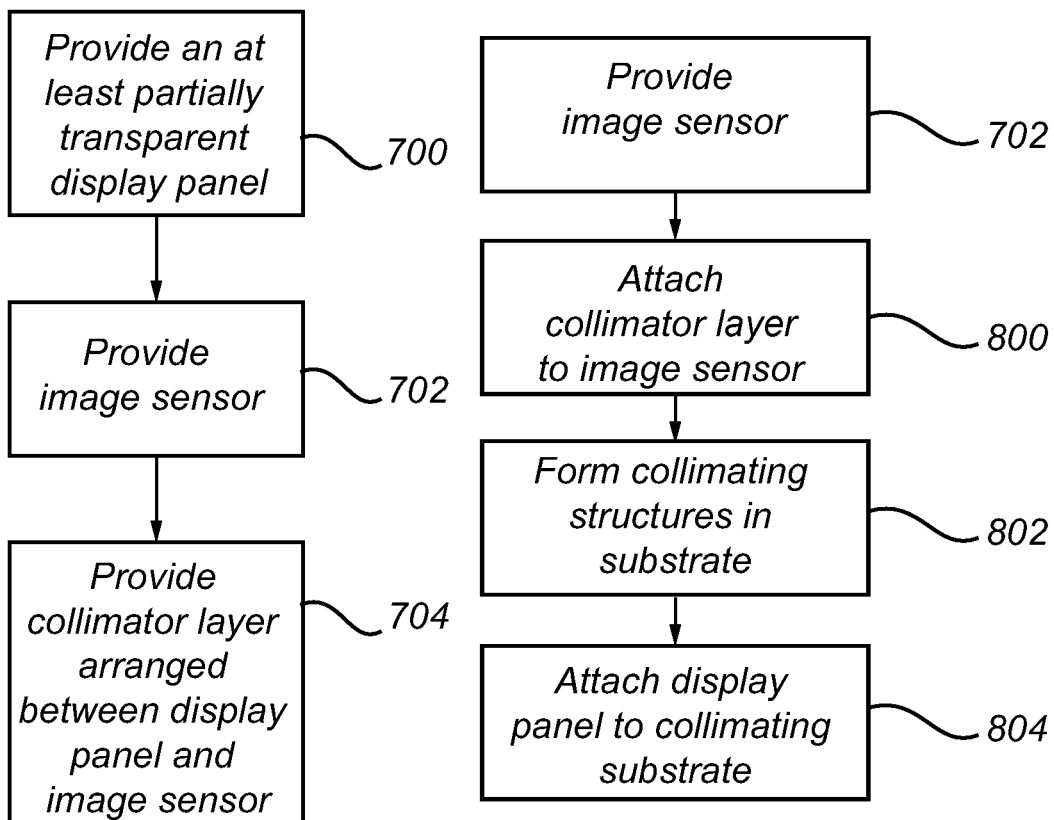
Fig. 7
Fig. 8
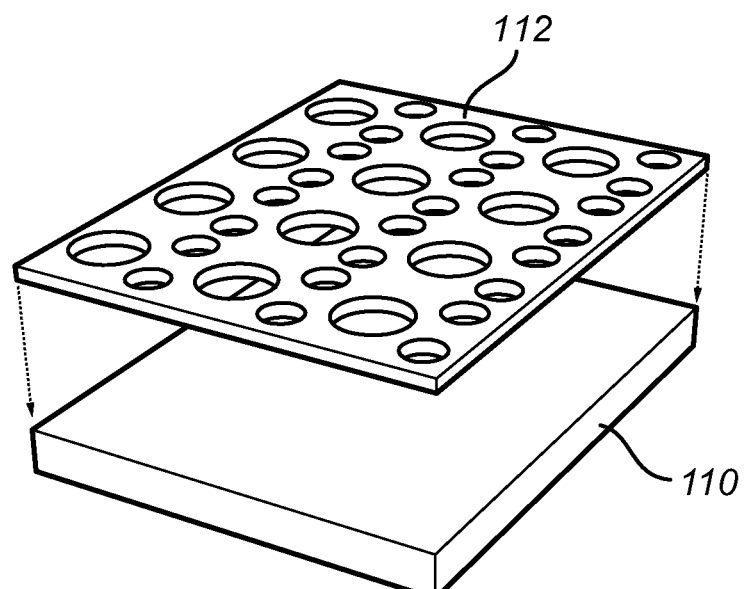
Fig. 9A

BIOMETRIC IMAGING DEVICE AND METHOD FOR MANUFACTURING A BIOMETRIC IMAGING DEVICE

CROSS-REFERENCE TO RELATED APPLICATIONS

This application is a 371 U.S. National Stage of International Application No. PCT/SE2019/050191, filed Mar. 5, 2019, which claims priority to Swedish Patent Application No. 1850287-2, filed Mar. 15, 2018. The disclosures of each of the above applications are incorporated herein by reference in their entirety.

FIELD OF THE INVENTION

The present invention relates to biometric imaging device integrated in a display panel and to a method for manufacturing such a biometric imaging device. In particular, the invention relates to a biometric imaging device in the form of an optical fingerprint sensor comprising collimating structures.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Biometric imaging can be performed using optical fingerprint sensors, which have been known for some time and which may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

Optical fingerprint sensors may for example be suitable for integration in a display panel of a portable electronic device such as a smartphone or tablet computer. However, currently known display panels are typically not fully transparent since there are circuitry and components in the display which cannot easily be made fully transparent. Moreover, the light transmission properties of the display panel may vary over the display area, and the transparency may also be different for different display types and for displays for different display panel manufacturers.

Accordingly, there is a need for a biometric imaging device which is suitable for integration with a display panel. It is preferably also possible to modify the design of the imaging device so that it can be used with display panels having different properties.

SUMMARY

In view of above-mentioned and other drawbacks of the prior art, it is an object of the present invention to provide an improved biometric imaging device comprising a display panel suitable for use in an electronic device.

According to a first aspect of the invention, there is provided a biometric imaging device configured to capture an image of an object in contact with an outer surface of the imaging device. The biometric imaging device comprises an at least partially transparent display panel having a repeating transmission pattern defined by an array of display unit cells, each display unit cell having the same transmission pattern; an image sensor comprising a photodetector pixel array arranged underneath the display panel; and a collimator layer arranged between the display panel and the image sensor, the collimator layer comprising a plurality of first collimating structures having a first collimator opening size and a plurality of second collimating structures having a second collimator opening size, the second collimator opening size being different from the first collimator opening size, wherein the respective collimator opening size and relative location of the first and second collimating structure in relation to the display unit cell is based on the transmission pattern of the display unit cell.

That the display panel is at least partially transparent means that there are at least portions of the display panel which transmit a sufficient amount of light for the image sensor to form an image of an object in contact with an outer surface of the display panel. Accordingly, light emitted by light emitting elements of the display panel will be emitted through a cover layer of the display panel and reflected by an object, such as a finger, in contact with the outer surface. The reflected light will in turn propagate through the display panel, through the collimating structures where the light is collimated and reach the image sensor to form an image of the object. It is further assumed that the captured image has a sufficiently high resolution to distinguish between ridges and valleys of a fingerprint. The captured fingerprint image can thereafter be used for biometric identification and verification.

The display panel may be any one of a number of known types of display panels, such as LED, OLED, µLED, electrochromic displays and other similar technologies, as long as the display panel is sufficiently transparent to allow for imaging through the display panel.

A display panel comprises a pixel array where each pixel is controllable to emit light such that an image can be formed in the display. In applications where all of the pixels in the pixel array have the same properties, each pixel thus has the same light transmission properties. Hence, the display unit cell may correspond to a pixel of the display. Moreover, the transmission pattern of an individual display unit cell, i.e. of a display pixel, depends on the display technology used and on the specific architecture and configuration used to form the display.

Accordingly, the present invention is based on the realization that it is advantageous to form the collimating structures based on the transmission pattern of the unit cell in order to maximize the amount of light reflected by the object which reaches the collimator openings, and subsequently the image sensor. For a larger collimator size, more light reaches the image sensor which makes it possible to capture an image under a display having lower transmittivity. However, the resolution is inversely proportional to the collimator size, meaning that a larger collimator results in a lower resolution. Thereby, by adapting the collimator properties based on the transmission pattern of the display panel, it is possible to optimize the trade-off between resolution and light sensitivity for the biometric imaging device.

According to one embodiment of the invention, the collimator layer may comprise at least one of the first collimating structure and at least one of the second collimating structure per display unit cell, meaning that at least one of each of first and second collimating structure is located directly underneath a display unit cell. Thereby, it may for example be possible to select which of the collimating structures to use for a particular image capture event while maximizing the achievable resolution. If a higher resolution is required, and if the intensity of transmitted light is sufficient, it is possible to use smaller collimator structures for image capture, and if the resolution requirements are relaxed and/or if the light transmission is low, the larger collimator structures may be used.

According to one embodiment of the invention, each display unit cell may comprise a first portion having a first transparency and a second portion having a second transparency, the first transparency being lower than the second transparency, and wherein a first collimating structure larger than a second collimating structure is aligned with the first portion of the display unit cell and the second collimating structure is aligned with the second portion of the display unit cell. Thereby, a more uniform signal distribution from different collimators within the display unit cell can be achieved. This in turn improves finger feature extraction since signal uniformity over the image is improved.

According to one embodiment of the invention, the display unit cell may have a uniform transparency. The described invention may advantageously be used also for a display comprising unit cells where the transparency is substantially the same across the area of the unit cell. As described above, by using collimating structures of different size for each display unit cell, different image resolutions are achievable and the choice of collimating structure, i.e. image resolution, may thus be adapted to achieve the best possible resolution for the amount of light reaching the collimating layer under a particular set of imaging conditions.

According to one embodiment of the invention, each first collimating structure is aligned with a respective display unit cell for a first sub-set of display unit cells, and each second collimating structure is aligned with a respective display unit cell for a second sub-set of display unit cells, the second sub-set of display unit cells being non-overlapping with the first sub-set of display unit cells. Thereby, there is only one collimating structure for each display unit cell in the described embodiment. This means that also here it is possible to achieve the above described trade-off between resolution and light sensitivity. The first and second sub-sets of display unit cells may be alternating to form interlaced arrays of unit cells.

According to one embodiment of the invention, the biometric imaging device may further comprise a pinhole layer arranged between the collimator layer and the image sensor or between the collimator layer and the display panel. The additional pinhole layer can reduce the requirements on height of the collimator structure for a specific application, thereby reducing manufacturing cost.

According to one embodiment of the invention, at least one of the first and second collimating structures is a circular collimating structure or a rectangular collimating structure, referring to the cross section of the collimating structure in the plane of the collimating layer. In principle the collimating structure may have a polygonal cross section anywhere between a between a rectangular and a circular shape. In some applications, a collimating structure having a circular cross section may be advantageous for ease of manufacturing. A circular collimator also has the same response in all directions, which can be beneficial. However, a more effective use of image sensor pixels and sensor area can be achieved with a rectangular collimator. Accordingly, there are advantages associated with both circular and rectangular collimators.

According to one embodiment of the invention, an aspect ratio between the height and width of each of the first and the second collimating structures may advantageously be in the range of 5:1 to 20:1. A lower aspect ratio means a larger acceptance angle, and that light is collected from a larger area of the object, hence, a lower resolution due to the low pass filtering.

According to a second aspect of the invention, there is provided a method for manufacturing a biometric imaging device configured to capture an image of an object in contact with an outer surface of the imaging device. The method comprises: providing an at least partially transparent display panel having a repeating transmission pattern defined by an array of unit cells, each unit cell having the same transmission pattern; providing an image sensor comprising a photodetector pixel array; and providing a collimator layer arranged between the display panel and the image sensor, the collimator layer comprising a plurality of first collimating structures having a first collimator opening size and a plurality of second collimating structures having a second collimator opening size, the second collimator opening size being different from the first collimator opening size, wherein the respective collimator opening size and relative location of the first and second collimating structure in relation to the display unit cell is based on the transmission pattern of the display unit cell.

According to one embodiment of the invention, providing the collimator layer may comprise: attaching a collimator substrate to the image sensor: forming the plurality of first collimating structures and the plurality of second collimating structures in the substrate; and attaching the display panel to the collimator substrate. Thereby, the collimating structures may be formed in the same manufacturing process as the formation of the biometric imaging device. The collimating substrate may for example be a wafer attached to a wafer comprising a plurality of image sensors, thereby enabling a large-scale manufacturing process.

According to one embodiment of the invention, forming the plurality of first collimating structures and the plurality of second collimating structures in the substrate may comprise forming openings in the collimator substrate. The collimating structures may thus be air-filled to provide the desirable difference in refractive index between the collimating structure and the surrounding material. However, the collimating structures may in principle be filled with any transparent material.

According to one embodiment of the invention, the plurality of first collimating structures and the plurality of second collimating structures may advantageously be formed by lithography and etching. Thereby, wafer scale formation of the collimating structures is enabled by using process which is readily compatible with standard semiconductor manufacturing methods.

According to one embodiment of the invention, the collimator substrate may be a silicon substrate, further facilitating integration with conventional wafer scale manufacturing methods.

According to one embodiment of the invention, providing the collimator layer arranged between the display panel and the image sensor may advantageously comprise: providing a collimator device comprising the plurality of first collimating structures and the plurality of second collimating structures in the substrate; attaching the collimator layer to the image sensor; and attaching the display panel to the collimator substrate. Accordingly, it is possible to manufacture the collimating layer separately which may be desirable in some applications.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 7 is a flow chart outlining general steps of a method according to an embodiment of the invention;

FIG. 8 is a flow chart outlining general steps of a method according to an embodiment of the invention.

DETAILED DESCRIPTION OF EXAMPLE EMBODIMENTS

In the present detailed description, various embodiments of the system and method according to the present invention are mainly described with reference to an optical biometric imaging device adapted for fingerprint sensing. However, it is equally possible to use the described device for detection of other objects such as a palm print.

Figure 1:
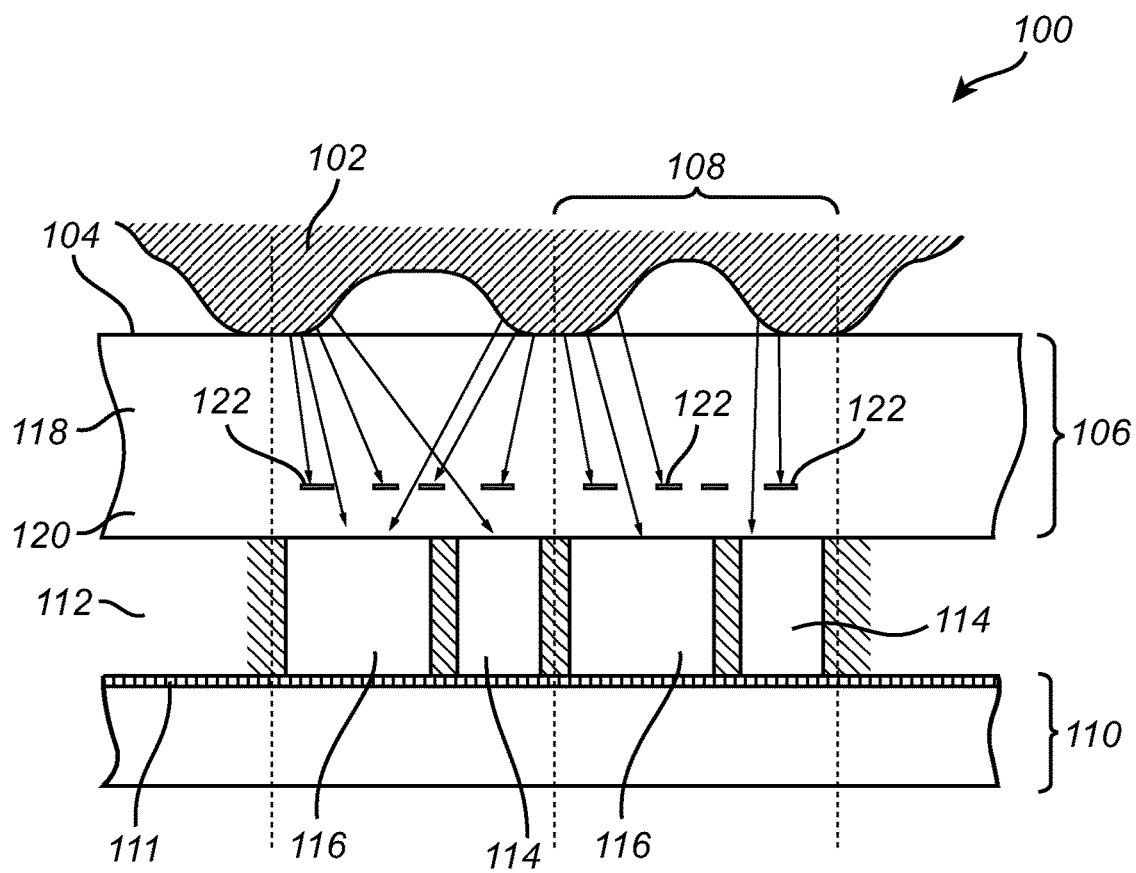
FIG. 1 schematically illustrates a biometric imaging device according to an embodiment of the invention.

FIG. 1 is a schematic cross section of an optical biometric imaging device 100 configured to capture an image of an object 102 in contact with an outer surface 104 of the imaging device. The object is here a finger and the biometric imaging device is configured to capture a fingerprint of the finger 102 placed on the outer surface 104. The biometric imaging device comprises an at least partially transparent display panel 106 comprising a repeating transmission pattern defined by an array of display unit cells 108, each display unit cell having the same transmission pattern. The biometric imaging device further comprises an image sensor 110 comprising a photodetector pixel array 111 arranged underneath the display panel 106, and a collimator layer 112 arranged between the display panel 106 and the image sensor 110, the collimator layer comprising a plurality of first collimating structures 114 having a first collimator opening size and a plurality of second collimating structures 116 having a second collimator opening size, the second collimator opening size being different from the first collimator opening size, wherein the respective collimator opening size and relative location of the first and second colli-mating structure 114, 116 in relation to the display unit cell 108 is based on the transmission pattern of the display unit cell 108.

The display panel 106 comprises a cover glass 118 and an active layer 120, where the active layer 120 may comprise control circuitry and light emitting element arranged on a transparent substrate. It is the portions 122 of the display unit cell 108 comprising control circuitry and light emitting elements which are not fully transparent and which are thus illustrated to block light reflected by the finger 108 from reaching the collimator layer 112 and the image sensor 110. However, for many types of display panels, the portions 122 of the display unit cell 108 comprising control circuitry and light emitting elements may still transmit a certain amount of light, depending on the thickness and material choice of the conductive layers used to form the active layer.

As illustrated in FIG. 1, the collimator layer 112 comprises two smaller collimating structures 114 and one larger collimating structure 116 per display unit cell 108, i.e. aligned with the display unit cell 108 and located directly below the unit cell 108. The larger collimating structure 116 is aligned with a portion of the unit cell comprising a higher amount of area portion with reduced or no transparency, whereas the smaller collimating structures 114 are located in area portions having a higher transparency. Thereby, it can be selected which collimating structures to use, i.e. which pixels in the pixels array 111 to use for a particular operating condition of the biometric imaging device 100.

Figure 2:
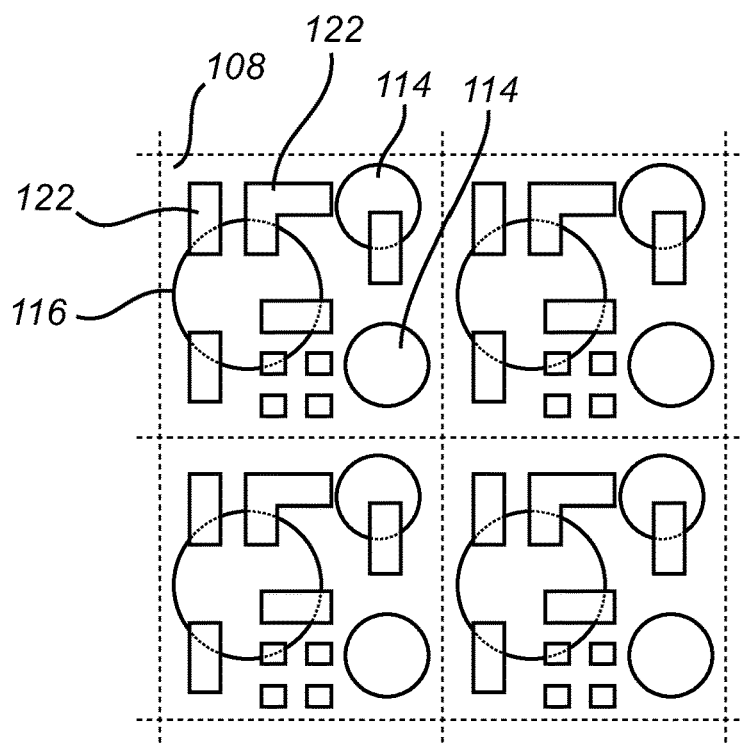
FIG. 2 schematically illustrates a portion of a biometric imaging device according to an embodiment of the invention.

FIG. 2 schematically illustrates a top view of a portion of the biometric imaging device where the repeatable transmission pattern for the display panel is illustrated, where each display unit cell 108 has the same transmission pattern. It is not required that the entire display panel has the same repeating transmission pattern, the described invention is applicable also if only a portion of the display panel comprises a repeatable transmission pattern. Moreover, the collimating layer 112 may cover only a portion of the area of the display panel 106.

Figure 3:
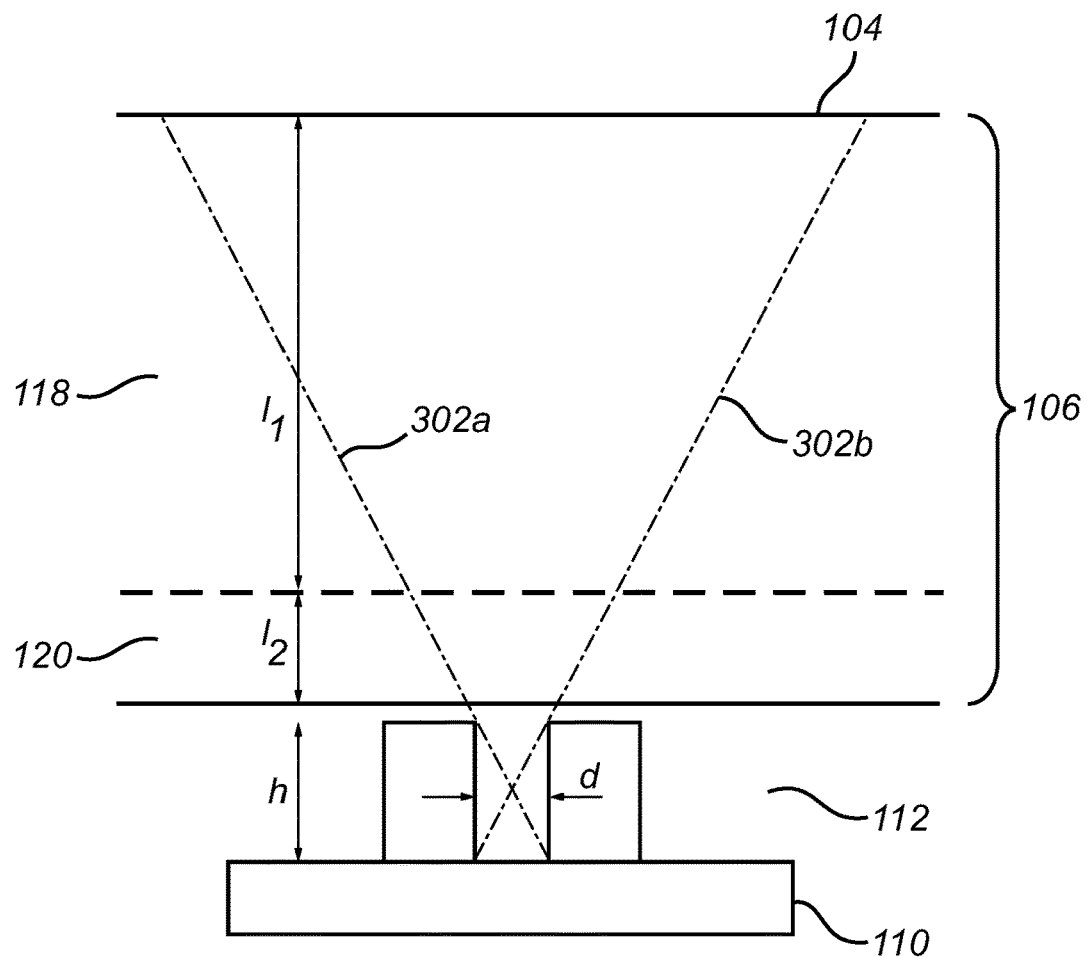
FIG. 3 schematically illustrates a portion of a biometric imaging device according to an embodiment of the invention.

Furthermore, FIG. 1 schematically illustrates the collimator working principle which will be described with further reference to FIG. 3 illustrating one collimator structure 116 in detail. The fundamental principle is that each collimator structure 114, 116 samples the light distribution at the top of the display 106, i.e. the object plane, and the light at each sample point is detected on e.g. a CMOS image sensor (CIS) 110. The height and width of the collimator structure 114, 116 restrict the field of view for each sampling point thereby reducing the low pass filtering from the finite field of view. Those entities will also affect the amount of light reaching the CIS, and hence the signal level.

FIG. 3 illustrates the geometry of one collimator structure 116 in detail, having a height h and a diameter d, the collimator structure 116 being positioned between the display panel 106 and the image sensor 110. The display panel has a total thickness of $I_1+I_2$, where $I_1$ is the thickness of the cover glass 108 and $I_2$ is the thickness of substrate under the active layer. The outer lines 302a-b of FIG. 3 indicates the light cone detected at each point over the collimator area on the image sensor 110.

Accordingly, each collimator sees a finite part A of the object, where the size of the finite part A is given by the geometry of the collimator. Over this distance each collimator collects all light though weighted with a radially decreasing function. The radial fall-off is due to the decreasing solid angle subtended by each collimator. Hence, any signal variations over this field-of-view will be highly suppressed and the collimator will act as a low pass filter.

Figure 4:
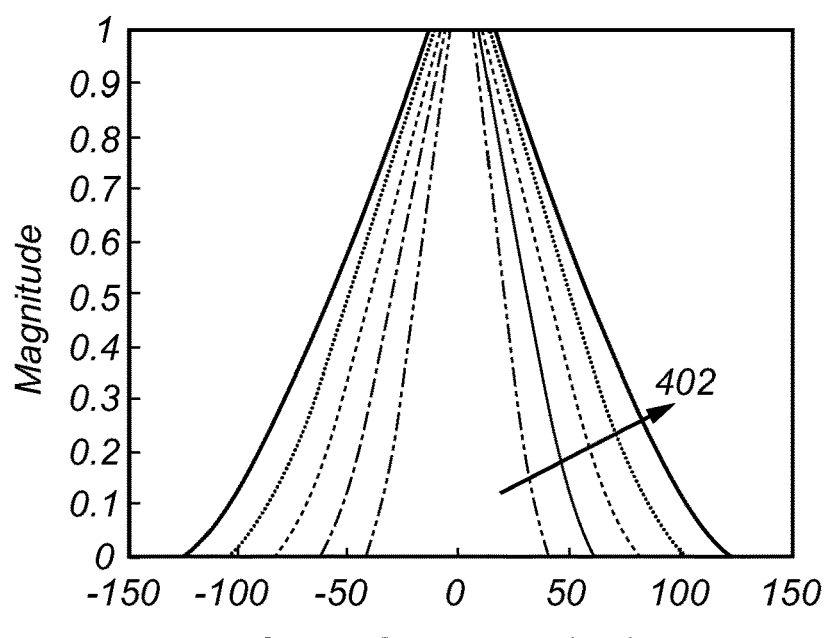
FIG. 4 schematically illustrates an imaging principle of a biometric imaging device according to an embodiment of the invention.

FIG. 4 schematically illustrates the radial weight function for collimators with increasing diameters in the direction of the arrow 402.

Figure 5A:
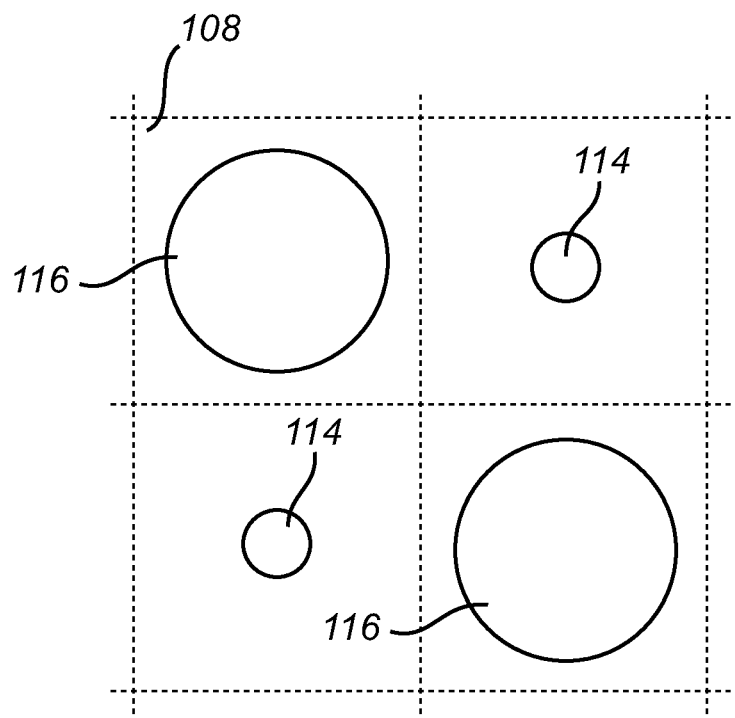
FIGS. 5A-B schematically illustrate portions of a biometric imaging device according to an embodiment of the invention.
Figure 5B:
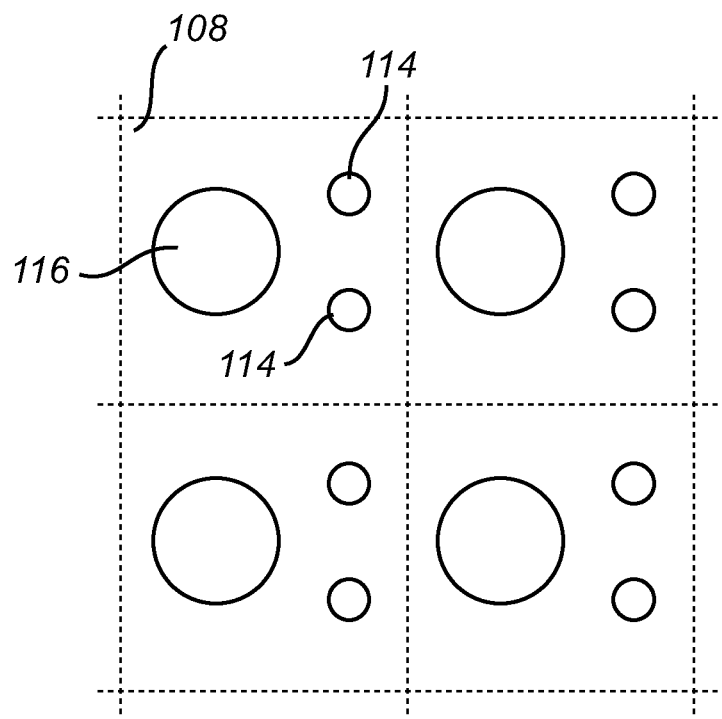

FIGS. 5A-B schematically illustrate embodiments of the biometric imaging device 100 where the display unit cell 108 has a uniform transparency. In FIG. 5A, the collimating layer 112 comprises one collimating structure for each unit cell 108, with alternating smaller and larger collimating structures, 114, 116, and in FIG. 5B each unit cell 108 comprises both smaller and larger collimating structures 114, 116. The skilled person readily realizes that the relative size and distribution of the collimating structures may be varied in many different ways to be suitable for use in different applications and with display panels having different properties. For commonly available display panels, the size of the unit cell may be in the range of 10 μm to 100 μm and the size of the collimators may be in the same range, i.e. between 10 μm and 100 μm, where the size of the collimating structure refers to the side of a rectangular collimating structure and to the diameter of a circular collimating structure. Moreover, an aspect ratio between the height and width of each of the first and the second collimating structures is in the range of 5:1 to 20:1, meaning that the height of the collimating structures may be in the range of 50 μm to 2000 μm.

Figure 6A:
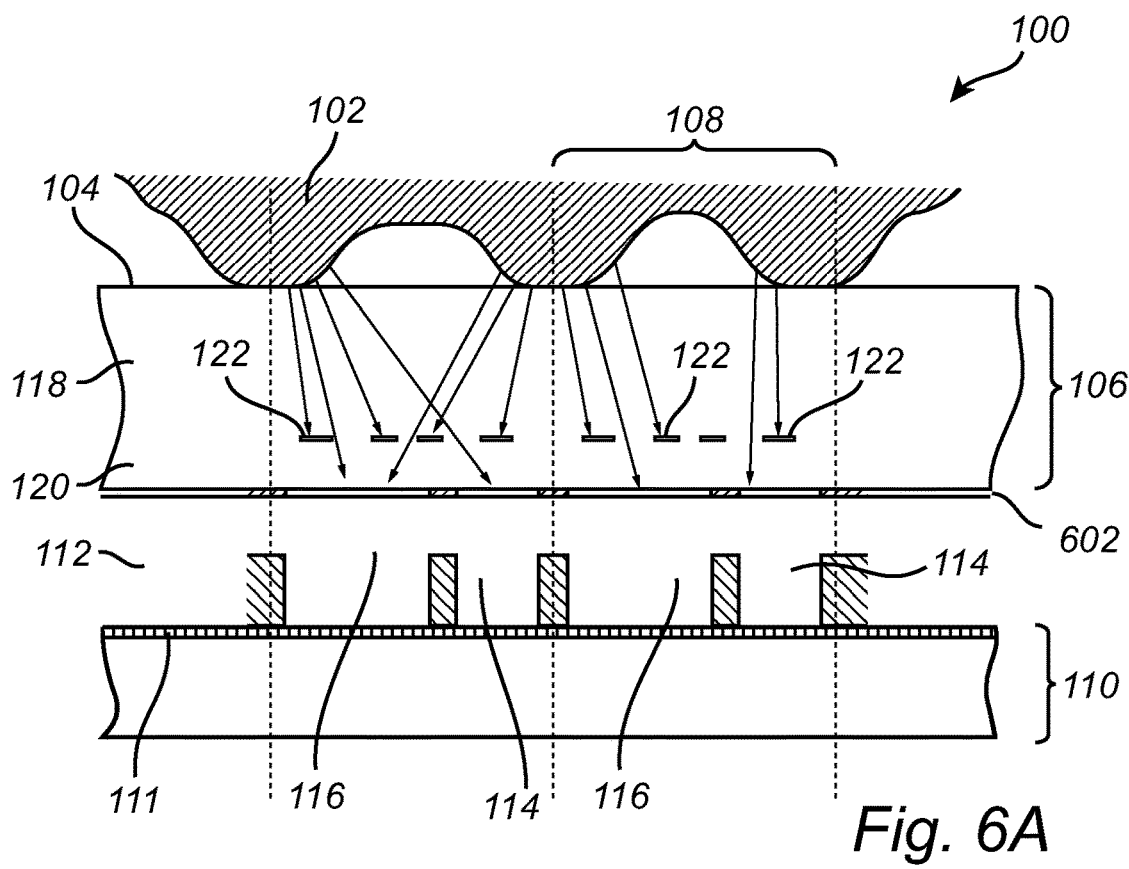
FIGS. 6A-B schematically illustrate biometric imaging devices according to embodiments of the invention.
Figure 6B:
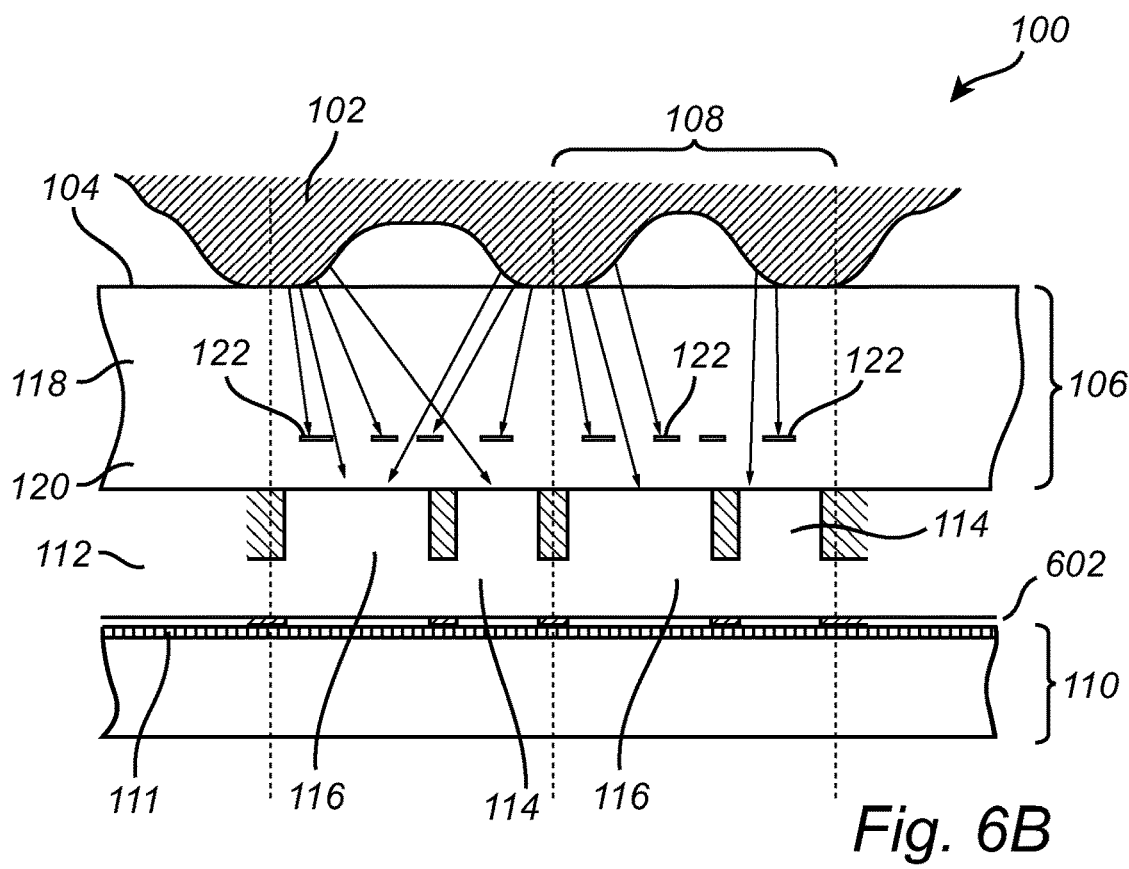

FIGS. 6A-B schematically illustrates a biometric imaging device similar to the device illustrated in FIG. 1, with the difference that the device of FIG. 6 comprises a pinhole layer 602 arranged either between the collimator layer 112 and the display 106 as illustrated in FIG. 6A or between the collimator layer 112 and the image sensor 110 as illustrated in FIG. 6B. As can be seen in FIG. 6, there is an offset between the pinhole layer 602 and the collimator layer 112. Moreover, the openings in the pinhole layer 602 may be of approximately the same size as the collimator openings. The combination of the pinhole layer 602 and the collimator layer 112 can be seen as an effectively longer collimator with a larger aspect ratio then for the collimator alone.

Figure 9B:
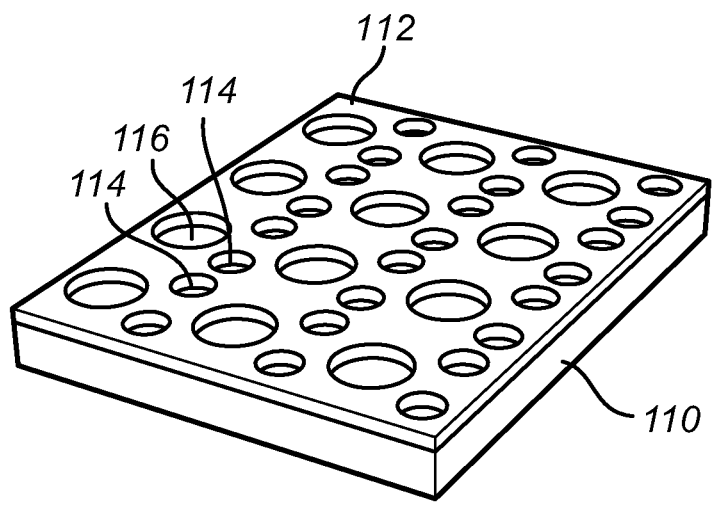
FIG. 9 schematically illustrates steps of a method according to an embodiment of the invention.
Figure 9C:
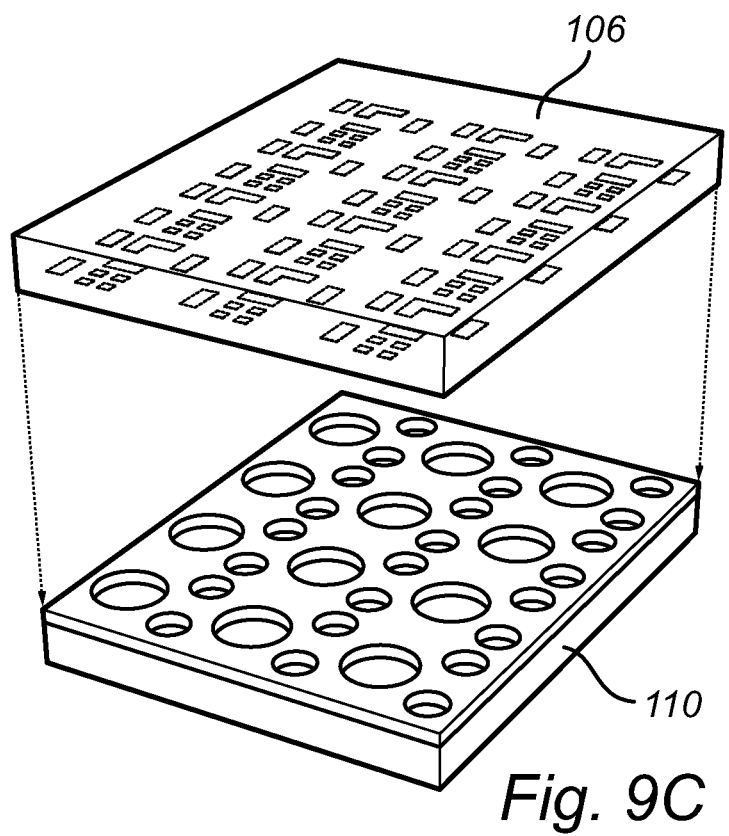

FIG. 7 and FIG. 8 are flow charts outlining various steps of method according to embodiments off the invention. FIGS. 9A-C schematically illustrate various steps of the methods according to the flow charts of FIG. 7 and FIG. 8.

FIG. 7 is a flow chart outlining the general steps of a method of manufacturing a biometric imaging device according to an embodiment of the invention comprising: providing 700 the display panel 106, providing 702 an image sensor 110 comprising a photodetector pixel array 111, and providing 704 a collimator layer 112 arranged between the display panel 106 and the image sensor 110.

FIG. 8 is a flow chart outlining the general steps of a method of manufacturing a biometric imaging device according to an embodiment of the invention. The method comprises attaching 800 a collimator substrate to the image sensor 110, forming 802 the plurality of first collimating structures 114 and the plurality of second collimating structures 116 in the substrate to form the collimating layer 112, with the resulting structure illustrated in FIG. 9B. The final step comprises attaching 804 the display panel 106 to the collimator substrate forming the collimating layer 112.

The collimator substrate may advantageously be a silicon die or wafer where collimating structures 114, 116 are formed as transparent portions of the substrate. After attaching the collimator substrate, which may be done by bonding, the collimator substrate can optionally be thinned down to reach the desired thickness, where the thickness of the collimator substrate determines the height of the resulting collimating structures. In the final step, the display panel 106 is attached to the collimator substrate to form the biometric imaging device 100, illustrated in FIG. 9C.

Even though the invention has been described with reference to specific exemplifying embodiments thereof, many different alterations, modifications and the like will become apparent for those skilled in the art. Also, it should be noted that parts of the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for manufacturing a biometric imaging device configured to capture an image of an object in contact with an outer surface of the imaging device, the method comprising:
   providing an at least partially transparent display panel having a repeating transmission pattern defined by an array of unit cells, each unit cell having the same transmission pattern;
   providing an image sensor comprising a photodetector pixel array; and
   providing a collimator layer arranged between the display panel and the image sensor, the collimator layer defining a plane and comprising a plurality of first collimating structures having a first collimator opening size and a plurality of second collimating structures having a second collimator opening size, the second collimator opening size being different from the first collimator opening size, wherein the respective collimator opening size and relative location of the first and second collimating structure in relation to the display unit cell is based on the transmission pattern of the display unit cell, and wherein one or more of the plurality of first collimating structures are arranged next to one or more of the plurality of second collimating structures in the plane of the collimator layer.

2. The method according to claim 1, wherein providing the collimator layer comprises:
   attaching a collimator substrate to the image sensor:
   forming the plurality of first collimating structures and the plurality of second collimating structures in the substrate; and
   attaching the display panel to the collimator substrate.

3. The method according to claim 2, wherein forming the plurality of first collimating structures and the plurality of second collimating structures in the substrate comprises forming openings in the collimator substrate.

4. The method according to claim 2, wherein the plurality of first collimating structures and the plurality of second collimating structures are formed by lithography and etching.

5. The method according to claim 2, wherein the collimator substrate is a silicon substrate.

6. The method according to claim 1, wherein providing the collimator layer arranged between the display panel and the image sensor comprises:

providing a collimator layer comprising the plurality of first collimating structures and the plurality of second collimating structures in the substrate;

attaching the collimator layer to the image sensor; and attaching the display panel to the collimator substrate.

7. The method according to claim 1, wherein the plurality of first collimating structures and the plurality of second collimating structures extend through the collimator layer.

8. A biometric imaging device configured to capture an image of an object in contact with an outer surface of the biometric imaging device, the biometric imaging device comprising:

an at least partially transparent display panel comprising a repeating transmission pattern defined by an array of display unit cells, each display unit cell having the same transmission pattern;

an image sensor comprising a photodetector pixel array arranged underneath the display panel; and a collimator layer arranged between the display panel and the image sensor, the collimator layer defining a plane and comprising a plurality of first collimating structures having a first collimator opening size and a plurality of second collimating structures having a second collimator opening size, the second collimator opening size being different from the first collimator opening size, wherein the respective collimator opening size and relative location of the first and second collimating structure in relation to the display unit cell is based on the transmission pattern of the display unit cell, and wherein one or more of the plurality of first collimating structures are arranged next to one or more of the plurality of second collimating structures in the plane of the collimator layer.

9. The biometric imaging device according to claim 8, wherein the collimator layer comprises at least one of the first collimating structure and at least one of the second collimating structure per display unit cell.

10. The biometric imaging device according to claim 9, wherein each display unit cell comprises a first portion having a first transparency and a second portion having a second transparency, the first transparency being lower than the second transparency, and wherein a first collimating structure larger than a second collimating structure is aligned with the first portion of the display unit cell and the second collimating structure is aligned with the second portion of the display unit cell.

11. The biometric imaging device according to claim 8, wherein the display unit cell has a uniform transparency.

12. The biometric imaging device according to claim 8, wherein each first collimating structure is aligned with a respective display unit cell for a first sub-set of display unit cells, and each second collimating structure is aligned with a respective display unit cell for a second sub-set of display unit cells, the second sub-set of display unit cells being non-overlapping with the first sub-set of display unit cells.

13. The biometric imaging device according to claim 8, further comprising a pinhole layer arranged between the collimator layer and the image sensor.

14. The biometric imaging device according to claim 8, further comprising a pinhole layer arranged between the collimator layer and the display panel.

15. The biometric imaging device according to claim 8, wherein at least one of the first and second collimating structures is a circular collimating structure.

16. The biometric imaging device according to claim 8, wherein at least one of the first and second collimating structures is a rectangular collimating structure.

17. The biometric imaging device according to claim 8, wherein an aspect ratio between the height and width of each of the first and the second collimating structures is in the range of 5:1 to 20:1.

18. The biometric imaging device according to claim 8, wherein the plurality of first collimating structures and the plurality of second collimating structures extend through the collimator layer.

* * * * *